2,802,664

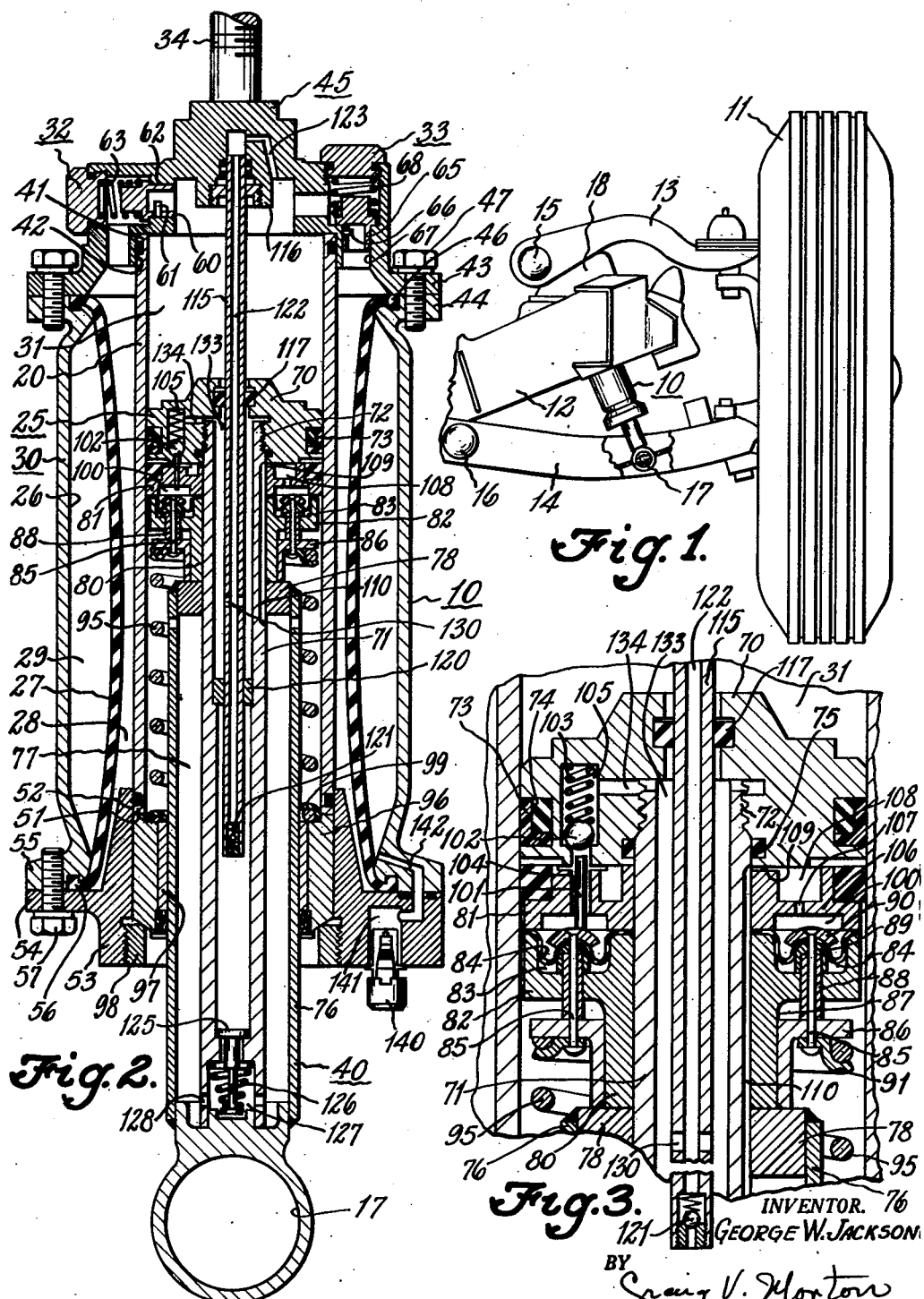

HYDRO-PNEUMATIC SUSPENSION UNIT

George W. Jackson, Dayton, Ohio, assignor to General Motors Corporation, Detroit, Mich., a corporation of Delaware Application April 26, 1955, Serial No. 503,886

9 Claims. (Cl. 267—64)

This invention relates to a hydro-pneumatic suspension unit particularly adapted for use on motor vehicles.

An object of the invention is to provide a hydro-pneumatic suspension unit with a hydraulic pump operated by actuation of the unit to continuously supply hydraulic fluid under pressure into the hydraulic chamber of the hydro-pneumatic unit and to include in the unit a valve for controlling exhaust of hydraulic fluid from the hydraulic chamber of the unit that is responsive to the position of the piston of the hydro-pneumatic unit in the cylinder thereof to maintain the piston in a predetermined relationship in the cylinder under varying load conditions carried by the vehicle.

It is another object of the invention to provide a hydro-pneumatic suspension unit in accordance with the foregoing object wherein the valve for controlling the exhaust of fluid from the hydraulic chamber of the unit is actuated only upon prolonged displacement of the piston out of a normal predetermined at rest position, a damping device being provided to prevent normal axle movements of the vehicle from effecting operation of the valve so long as the piston movement is such that the average of the movements of the piston disposes the piston in a predetermined relationship between opposite ends of the cylinder of the unit.

Further objects and advantages of the present invention will be apparent from the following description, reference being had to the accompanying drawings wherein a preferred form of the invention is clearly shown.

In the drawings:

Figure 1 is an elevational view of a portion of a front end suspension for a motor vehicle incorporating the hydro-pneumatic suspension unit of this invention.

Figure 2 is a longitudinal cross sectional view of the suspension unit of this invention.

Figure 3 is an enlarged longitudinal cross sectional view of a portion of the mechanism illustrated in Figure 1.

In this invention the hydro-pneumatic suspension unit 10 is adapted for supporting the wheel 11 of a motor vehicle relative to the frame 12 thereof and allow for freedom of movement of the wheel relative to the frame under control of resilient cushioning action effected by the hydro-pneumatic suspension unit.

The wheel 11 of the vehicle is supported from the frame 12 by means of an upper control arm 13 and a lower control arm 14 pivotally supported on the frame 12 by means of pivot connections 15 and 16. The hydro-pneumatic suspension unit 10 has one end thereof pivotally connected to the lower control arm 14 by means of a pivot connection 17. The upper end of the hydro-pneumatic suspension unit is pivotally connected to a part of the frame in the housing 18.

The hydro-pneumatic suspension unit comprises a cylinder 20 that contains a piston 25 that is reciprocable in the cylinder 20. The cylinder 20 is supported within a housing 30 that has a cylindrical wall 26 spaced from the cylinder 20 to form a fluid receiving chamber between the cylinder 20 and the wall 26.

A flexible expansible tubular wall 27 divides the chamber between the cylinder 20 and the wall 26 of the housing 30 into two independent compartments 28 and 29. The compartment 28, as well as the chamber 31 in the cylinder 20 is filled with a hydraulic fluid. The compartment 29 contains a gaseous fluid medium under pressure.

The piston 25 carries an operating rod 40 that has the lower pivot connection 17 that is connected to the lower control arm 14 heretofore described.

The cylinder 20 carries a closure member 45 that has oppositely acting flow control valves 32 and 33 for regulating the flow of hydraulic fluid between the chambers 31 and 28 upon reciprocation of the piston 25 in the cylinder 20. The closure member 45 has a fitting 34 that connects with the frame 12 for supporting this end of the suspension unit 10.

With the chambers 28 and 31 filled with hydraulic fluid, it is apparent that the gaseous fluid pressure confined within the chamber 29 will effect a balance against the pressure of the hydraulic fluid in the chambers 31 and 28 when load is applied to opposite ends of the suspension unit to dispose the piston 25 in a predetermined at rest position between opposite ends of the cylinder 20. A normal at rest position of the piston 25 is illustrated in Figure 2, it being assumed that a predetermined load is applied to opposite ends of the suspension unit to place the hydraulic fluid in the chambers 28 and 31 under a predetermined pressure that is balanced by the pressure of the gaseous fluid medium in the chamber 29 whereby to resiliently support the load with the piston disposed in the predetermined position illustrated.

As the piston 25 reciprocates in the cylinder 20 under action of the vehicle wheel 11, fluid will be displaced between the chambers 31 and 28 through the control valves 32 and 33 to effect compression and release of compression of the gaseous pressure fluid medium in the chamber 29 and thereby resiliently support the movements of the vehicle wheel 11 relative to the frame 12.

In more detail, the cylinder 20 carries the closure member 45 on the end thereof, the end 41 of the cylinder being disposed within a recess 42 provided in the closure member 45. The closure member 45 has a radial flange 43 that engages a radial flange 44 on the housing 30 whereby to confine the end 46 of the flexible expansible wall 27 between the flanges 43 and 44. Suitable bolts 47 retain the closure member 45 on the housing 30.

The opposite end 51 of the cylinder 20 is placed within a bore 52 on a closure member 53. The closure member 53 has a radial flange 54 that engages a radial flange 55 on the housing 30 to retain the end 56 of the flexible expansible tubular wall 27 therebetween. Suitable bolts 57 secure the closure member 53 to the housing flange 55.

The upper control valve 32 consists of a sleeve valve 60 that has a radial opening 61. The sleeve valve 60 slides within a bore 62 provided in the closure member 45. The valve 60 is maintained in the position shown in the drawing by means of a compression spring 63. Similarly the flow control valve 33 comprises a sleeve valve 65 having a radial opening 66. The sleeve valve 65 is slidably positioned in a bore 67 in the closure member 45. A compression spring 68 resiliently holds the valve 65 in seated position shown in the drawings.

The flow control valve 32 opens upon increase in pressure in the chamber 31 to allow fluid to be displaced from the chamber 31 through the valve opening 61 into the hydraulic fluid chamber 28 in the housing 30.

The valve 33 is a reversely or oppositely acting valve so that when the piston 25 moves downwardly to increase the volume of the chamber 31, the valve 65 will open to allow hydraulic fluid to be displaced from the chamber 28 in the housing 30 through the valve opening 66 into the chamber 31 in the cylinder 20, the gaseous pressure medium in the chamber 29 effecting the flow of fluid at this time.

The assembly of the piston 25 and the operating rod 40 consists of a piston head 70 threadedly received on a cylinder sleeve 71 and retained thereon by the inter engaging threads 72. The piston head 70 carries an annular ring seal 73 that is backed up by a resilient rubber member 74 that urges the ring seal 73 into engagement with the cylinder 20 to prevent loss of hydraulic fluid from the chamber 31. A resilient seal 75 is provided between the piston head 70 and the cylinder sleeve 71 to seal against hydraulic fluid leakage between these parts. The operating rod 40 comprises a hollow sleeve 76 disposed around the cylinder sleeve 71 to form a reservoir chamber 77 containing a body of hydraulic fluid. The sleeve 76 is secured at the lower end to the fitting 17 by which the suspension unit is attached to the vehicle. The upper end of the sleeve 76 carries a ring 78 that fits upon the outer diameter of the cylinder sleeve 71.

A spacer member 80 is positioned on the upper end of the sleeve 76 and above it a second spacer 81, the spacer members 80 and 81 being retained between the ring 78 and the head 70 of the piston by the threaded engagement 72 between the piston 70 and the cylinder sleeve 71.

The spacer member 80 has an enlarged radially flanged portion 82 that has a recess chamber 83. The chamber 83 is closed by a rubber-like diaphragm 84 retained between the outer and inner peripheries of the spacer members 81 and 82. The diaphragm 84 carries a plurality of pins 85 that extend between the annularly flanged member 86 slidably disposed on the reduced diameter portion 87 of the spacer member 82. The pins 85 retain together the assembly comprising the member 86, the sleeves 88 and the diaphragm retaining members 89 and 90, a spring retainer 91 also being secured to the flanged member 86 by the pins 85. A coil spring 95 is disposed between the slidable member 86 and a closure member 96 placed in the bore 52 of the closure member 53. The hollow sleeve 76 is slidably disposed in the bearing sleeve 97 in the member 96 and provides the rod guide for the operating rod 40. A retaining nut 98 holds the assembly consisting of the closure member 96 and the cylinder 20 in the housing 30. The lower end of the spring 95 is secured to the closure member 96 by means of a spring retainer 99. A spring 95 is thus held between the closure member 96 and the flanged member 86.

The diaphragm retaining member 90 is adapted to move into a recess chamber 100 provided in the spacer member 81 to engage the pin 101 that actuates a ball valve 102 normally retained on its seat by means of the compression spring 103.

A passage 104 is provided around the pin 101 to provide for flow of fluid from the spring retaining chamber 105 into the chamber 100.

The wall 106 of the chamber 100 has an orifice passage 107 therein adapted to restrict flow of hydraulic fluid from the chamber 100 into the chamber 108. An orifice passage 109 is provided between the chamber 108 and a groove 110 provided in the surface of the cylinder sleeve 71 whereby the chamber 108 is connected with the reservoir chamber 77.

A hollow plunger rod 115 has the upper end thereof secured to the closure member 45 by means of the fitting 116. The hollow plunger rod 115 passes through the piston head 70 and a seal member 117 is provided between the rod 115 and the head 70 to seal against leakage of hydraulic fluid from the chamber 31.

The lower end of the plunger rod 115 passes through a bearing sleeve 120 provided between the rod 115 and the cylinder sleeve 71. A ball check valve 121 is provided in the lower end of the plunger rod 115. The internal passage 122 in the rod 115 connects at its upper end with the passage 123 in the closure member 45.

The lower end of the cylinder sleeve 71 carries a valve member 125 that is spring urged to the closed position shown by the compression spring 126 contained in the spring chamber 127. The spring chamber 127 communicates with the reservoir chamber 77 through the passages 128. The cylinder sleeve 71, the plunger member 115 and the valves 121 and 125 provide a pump assembly to withdraw fluid from the reservoir chamber 77 through the valve 125 and displace it through the passage 122 in the plunger 115 into the chamber 31 of the cylinder 20. The pump action is obtained upon reciprocable movement of the piston 25 and operating rod 40 relative to the plunger member 115.

The plunger member 115 has ports 130 provided therein whereby the hydraulic fluid in the chamber 31 can pass through the passages 123 and 122 into the chamber 133 provided between the plunger 115 and the upper end of the cylinder sleeve 71. The chamber 133 communicates with the spring chamber 105 in the piston head 70 by means of the passage 134 to provide for exhaust of hydraulic fluid from the chamber 131 under conditions of operation wherein the valve 102 is opened to provide for exhaust of fluid.

A gaseous fluid pressure medium inlet valve 140 is provided in the closure member 53, the valve seating in a valve chamber 141 that communicates with the compartment 29 in the housing 30 by means of the passage 142.

In operation, the apparatus described has the several parts thereof illustrated in an at rest position of the hydro-pneumatic suspension unit. Under this condition the chamber 31 and compartment 28 are filled with a determined volume of hydraulic fluid that is held under pressure by opposing forces applied to opposite ends of the suspension unit when the suspension unit is in operating position illustrated in Figure 1. The pressure of the gaseous fluid medium in the compartment 29 of the housing 30 balances the hydraulic pressure in the chambers 31 and 28 whereby the piston 25 is disposed in the position illustrated in Figure 2. The reservoir chamber 77 contains a volume of hydraulic fluid that can be removed from the reservoir chamber by the action of the pump plunger 115 in the cylinder 71 to deliver the fluid into the chamber 31 of the cylinder 20.

So long as the hydro-pneumatic suspension unit is in the at rest position illustrated the exhaust valve 102 is closed and the diaphragm member 84 is in the position illustrated with the pin 101 out of engagement with the wall valve 102. In this condition, assuming the piston 25 to be in a normal position for sustaining the load of the vehicle, the spring 95 is in a substantially free length condition whereby the slidable member 86 is in the down position illustrated to allow the exhaust valve 102 to remain closed.

Whenever the vehicle is in motion the pump comprising the cylinder 71 and the plunger 115 continuously supplies hydraulic fluid under pressure from the reservoir 77 into the chamber 31. Obviously, the volume of fluid thus delivered will quickly raise the pressure in the chambers 31 and 28 above a value that balances the load of the vehicle against the gaseous pressure in the compartment 29 with the result that the increase in pressure in the chambers 28 and 31 will effect a displacement of the piston 25 away from the closure member 45. This tends to increase the overall length of the suspension unit and cause the vehicle to ride higher than normal.

However, the displacement of the piston 25 away from the closure member 45 as a result of an increase of pressure in the chamber 31 effects compression of the spring 95 so that the slidable member 86 is moved toward the piston head 70 until the pin 101 engages the ball valve 102 to open the passage 104. When the ball valve 102 is raised off its seat hydraulic fluid can then exhaust from the chamber 31 through the passage 123, the hollow plunger rod 115, port 130 into chamber 133 and thence through passage 134 into the spring chamber 105 and from thence through the passage 104 into the chamber 100 that is in communication within the reservoir chamber 77 through means of the resistance passage 107, the chamber 108, resistance passage 109 and the slot 110 in the periphery of the cylinder sleeve 71.

Thus, any build up in pressure in the chamber 31 caused by action of the pump will in turn cause the excess pressure to be exhaused through the valve 102 so that the piston 25 will remain in a predetermined spaced relationship relative to the closure member 45.

Obviously, under normal reciprocable action of the piston 25 in the cylinder 20 the rapid movements effected by the wheel of the vehicle would cause an operation of the valve 102 excessively so that a high volume of fluid would have to be delivered by the action of the pump elements 71 and 115 into the chamber 31 to offset the exhaust of fluid from the chamber and still maintain the piston 25 in a predetermined position relative to the closure member 45.

However, this is prevented by the action of the resistance passages 107 and 109 acting as a damping means to prevent a high flow of hydraulic fluid from the chamber 100 into the chamber 108 and from the chamber 108 to the reservoir chamber 77. The resistance to flow of hydraulic fluid effected by the resistance passages 107 and 109 prevents rapid exhaust of hydraulic fluid from the chambers 100 and 108. Thus, when the piston 25 operates in a normal reciprocable movement which normally compresses the spring 95, the volume of hydraulic fluid in the chamber 100 prevents movement of the diaphragm 84 so that the valve 102 will not be opened to exhaust fluid from the chamber 31 as heretofore described.

It is only when the reciprocable movements of the piston 25 are such that the average of the movements results in a relative displacement of the piston 25 from the closure member 45 greater than that of the established predetermined position required to sustain the load of the vehicle so that the spring 95 will urge the slidable member 86 toward the piston head 25 and thereby move the diaphragm member 84 to open the exhaust valve 102. The normal rapid oscillations of the wheel resulting from road conditions will therefore have no effect on the operation of the suspension unit insofar as controlling the position of the piston 25 in the cylinder 20.

Assuming the position of the parts of the mechanism as illustrated to be that attained when the vehicle is in an unloaded condition and in an at rest position, an increase in load in the vehicle will result in compression of the hydraulic fluid in the chambers 31 and 28 acting against the gaseous fluid medium in the chamber 29. This will result in a lower riding of the vehicle until such time as the pump is able to supply fluid from the reservoir 77 into the chamber 31 to increase the volume of fluid in the chambers 31 and 28 to return the piston 25 to its normal at rest position which gives the proper ride height between the axle of the vehicle and the body.

Upon a decrease in load in the vehicle, following a load increase, the volume of fluid in the chambers 31 and 28 will be greater than that required to dispose the piston in the normal at rest position with the gaseous fluid medium in the compartment 29 displacing the excess fluid into the chamber 31 at the new established balance between compression of the gaseous fluid medium under the lightened load condition. Under this circumstance the displacement of the piston 25 away from the closure member 45 will effect compression of the spring 95 to actuate the exhaust valve 102 to open the same and allow the excess volume of fluid to be exhausted from the chamber 31 into the reservoir chamber 77 until the piston 25 returns to its normal at rest position relative to the closure member 45.

While the form of embodiment of the invention as herein disclosed constitutes a preferred form, it is to be understood that other forms might be adopted as may come within the scope of the claims which follow.

What is claimed is as follows:

1. A hydro-pneumatic suspension unit for a vehicle, comprising, a cylinder having a piston reciprocable therein connected with an operating rod extending from one end of said cylinder, means forming a chamber around said cylinder for receiving fluid medium and including a flexible expansible wall dividing said chamber into two independent compartments one of which is filled with hydraulic fluid medium and the other of which contains a gaseous fluid medium under pressure, closure means at the opposite end of said cylinder closing the same, oppositely acting flow control valve means at the said opposite end of said cylinder regulating displacement of hydraulic fluid between said cylinder and said one compartment, the gaseous pressure medium in said other compartment providing resilient support of opposed forces applied to opposite ends of the suspension unit as transmitted by the hydraulic fluid medium in said cylinder and said one compartment and resilient resistance to relative movement between said piston and the said cylinder effecting variable volumetric displacement between said cylinder and said one compartment, means forming a reservoir within the suspension unit for hydraulic fluid, pump means within the suspension unit and activated by relative movement between said cylinder and piston for delivering hydraulic fluid under pressure from said reservoir into the body of hydraulic fluid active between said cylinder and said one compartment, and valve means operable to exhaust hydraulic fluid from the said body of fluid to said reservoir, said pump means and said valve means effecting control of the volume of fluid in the said body of fluid to dispose the said piston in a predetermined at rest position between ends of the cylinder under variable load conditions carried by the vehicle.

2. A hydro-pneumatic suspension unit for a vehicle in accordance with claim 1 in which the said valve means is actuated to exhaust fluid from the said body of fluid into said reservoir in response to prolonged displacement of the piston away from said closure means a distance greater than that established by the said predetermined at rest position relative to the said closure means.

3. A hydro-pneumatic suspension unit for a vehicle in accordance with claim 1 that includes flow resistance means between said valve means and said reservoir to effect restriction to flow of hydraulic fluid from the valve means to said reservoir to prevent high volume flow of fluid through said valve to said reservoir during normal stroke operation of said piston in said cylinder.

4. A hydro-pneumatic suspension unit for a vehicle in accordance with claim 1 that includes means responsive to prolonged displacement of the said piston away from said closure means a distance greater than that established by the said predetermined position relative to the said closure means to actuate said valve to exhaust fluid from said body of fluid to said reservoir so long as said piston is in the said displaced position whereby to reduce the volume of fluid in said body of fluid to permit said piston to reestablish its position at the predetermined at rest position under the load condition imposed on the suspension unit by the vehicle.

5. A hydro-pneumatic suspension unit for a vehicle, comprising, a cylinder having a piston reciprocable therein connected with an operating rod extending from one end of said cylinder, means forming a chamber around said cylinder for receiving fluid medium and including a flexible expansible wall dividing said chamber into two independent compartments one of which is filled with hydraulic fluid medium and the other of which contains a gaseous fluid medium under pressure, closure means at the opposite end of said cylinder closing the same, oppositely acting flow control valve means at the said opposite end of said cylinder regulating displacement of hydraulic fluid between said cylinder and said one compartment, the gaseous pressure medium in said other compartment providing resilient support of opposed forces applied to opposite ends of the suspension unit as transmitted by the hydraulic fluid medium in said cylinder and said one compartment and resilient resistance to relative movement between said piston and the said cylinder effecting variable volumetric displacement between said cylinder and said one compartment, means forming a reservoir within the suspension unit for hydraulic fluid, pump means within the suspension unit and activated by relative movement between said cylinder and piston for delivering hydraulic fluid under pressure from said reservoir into the body of hydraulic fluid active between said cylinder and said one compartment, valve means operable to exhaust hydraulic fluid from the said body of fluid to said reservoir, said pump means and said valve means effecting control of the volume of fluid in the said body of fluid to dispose the said piston in a predetermined at rest position between ends of the cylinder under variable load conditions carried by the vehicle, means responsive to prolonged displacement of the piston away from said closure means a distance greater than that established by the said predetermined at rest position relative to the said closure means to actuate said valve to exhaust hydraulic fluid from the said body of fluid to said reservoir, and means providing hydraulic damping means operably effective on said last mentioned means to damp response of said last mentioned means to the said displacement of the piston and thereby prevent operation of the said last mentioned means to actuate said valve during normal stroke operation of said piston so long as said piston movement averages to the said predetermined position.

6. A hydro-pneumatic suspension unit for a vehicle, comprising, a cylinder having a piston reciprocable therein connected with an operating rod extending from one end of said cylinder, means forming a chamber around said cylinder for receiving fluid medium and including a flexible expansible wall dividing said chamber into two independent compartments one of which is filled with hydraulic fluid medium and the other of which contains a gaseous fluid medium under pressure, closure means at the opposite end of said cylinder closing the same, oppositely acting flow control valve means at the said opposite end of said cylinder regulating displacement of hydraulic fluid between said cylinder and said one compartment, the gaseous pressure medium in said other compartment providing resilient support of opposed forces applied to opposite ends of the suspension unit as transmitted by the hydraulic fluid medium in said cylinder and said one compartment and resilient resistance to relative movement between said piston and the said cylinder effecting variable volumetric displacement between said cylinder and said one compartment, said rod being hollow and forming a reservoir for hydraulic fluid, pump means in said hollow rod having connection with said reservoir and the body of hydraulic fluid active between said cylinder and said one compartment to supply hydraulic fluid under pressure from said reservoir to the said body, said pump means having connection with said piston and said cylinder whereby to effect actuation of the pump upon relative movement between the piston and the cylinder, and exhaust valve means in said piston to exhaust hydraulic fluid from the said body of fluid to said reservoir, said pump means and said exhaust valve means effecting control of the volume of fluid in the said body of fluid to dispose the said piston in a predetermined at rest position between opposite ends of the cylinder under variable load conditions carried by the vehicle.

7. A hydro-pneumatic suspension unit for a vehicle, comprising, a cylinder having a piston reciprocable therein connected with an operating rod extending from one end of said cylinder, means forming a chamber around said cylinder for receiving fluid medium and including a flexible expansible wall dividing said chamber into two independent compartments one of which is filled with hydraulic fluid medium and the other of which contains a gaseous fluid medium under pressure, closure means at the opposite end of said cylinder closing the same, oppositely acting flow control valve means at the said opposite end of said cylinder regulating displacement of hydraulic fluid between said cylinder and said one compartment, the gaseous pressure medium in said other compartment providing resilient support of opposed forces applied to opposite ends of the suspension unit as transmitted by the hydraulic fluid medium in said cylinder and said one compartment and resilient resistance to relative movement between said piston and the said cylinder effecting variable volumetric displacement between said cylinder and said one compartment, said rod being hollow and forming a reservoir for hydraulic fluid, cylinder means in said rod forming a pump cylinder and having valve means providing for flow of hydraulic fluid from said reservoir into said pump cylinder, piston plunger means disposed in said pump cylinder and carried on said closure means for stationary mounting of the said piston plunger means relative to said pump cylinder and having valve means providing for flow of hydraulic fluid from the pump cylinder to the body of hydraulic fluid active between said cylinder and said one compartment, said piston plunger means having a passage for conduction of the hydraulic fluid from the pump cylinder to the said body of fluid, and exhaust valve means in said piston to exhaust hydraulic fluid from the said body of fluid to said reservoir, said pump means and said exhaust valve means effecting control of the volume of fluid in the said body of fluid to dispose the said piston in a predetermined at rest position between opposite ends of the cylinder under variable load conditions carried by the vehicle.

8. A hydro-pneumatic suspension unit for a vehicle, comprising, a cylinder having a piston reciprocable therein connected with an operating rod extending from one end of said cylinder, means forming a chamber around said cylinder for receiving fluid medium and including a flexible expansible wall dividing said chamber into two independent compartments one of which is filled with hydraulic fluid medium and the other of which contains a gaseous fluid medium under pressure, closure means at the opposite end of said cylinder closing the same, oppositely acting flow control valve means at the said opposite end of said cylinder regulating displacement of hydraulic fluid between said cylinder and said one compartment, the gaseous pressure medium in said other compartment providing resilient support of opposed forces applied to opposite ends of the suspension unit as transmitted by the hydraulic fluid medium in said cylinder and said one compartment and resilient resistance to relative movement between said piston and the said cylinder effecting variable volumetric displacement between said cylinder and said one compartment, means forming a reservoir within the suspension unit for hydraulic fluid, pump means within the suspension unit and activated by relative movement between said cylinder and piston for delivering hydraulic fluid under pressure from said reservoir to the body of hydraulic fluid active between said cylinder and said one compartment, exhaust valve means in said piston operable to exhaust hydraulic fluid from the said body of fluid to said reservoir, actuating means for said exhaust valve means movable on said piston, spring means engaging said actuating means and normally ineffective to move the actuating means relative to said exhaust valve means so long as said piston is in normal predetermined position and effective to cause movement of said actuating means relative to said exhaust valve means to open the same on movement of said piston relative to said spring means on displacement of said piston away from said closure means a distance greater than that established by the said predetermined position of the piston relative to said closure means, said pump means and said exhaust valve means effecting control of the volume of fluid in the said body of fluid to dispose the said piston in a predetermined at rest position between opposite ends of the cylinder under variable load conditions carried by the vehicle.

9. A hydro-pneumatic suspension unit for a vehicle, comprising, a cylinder having a piston reciprocable therein connected with an operating rod extending from one end of said cylinder, means forming a chamber around said cylinder for receiving fluid medium and including a flexible expansible wall dividing said chamber into two independent compartments one of which is filled with hydraulic fluid medium and the other of which contains a gaseous fluid medium under pressure, closure means at the opposite end of said cylinder closing the same, oppositely acting flow control valve means at the said opposite end of said cylinder regulating displacement of hydraulic fluid between said cylinder and said one compartment, the gaseous pressure medium in said other compartment providing resilient support of opposed forces applied to opposite ends of the suspension unit as transmitted by the hydraulic fluid medium in said cylinder and said one compartment and resilient resistance to relative movement between said piston and the said cylinder effecting variable volumetric displacement between said cylinder and said one compartment, means forming a reservoir within the suspension unit for hydraulic fluid, pump means within the suspension unit and activated by relative movement between said cylinder and piston for delivering hydraulic fluid under pressure from said reservoir to the body of hydraulic fluid active between said cylinder and said one compartment, exhaust valve means in said piston operable to exhaust hydraulic fluid from the said body of fluid to said reservoir, actuating means for said exhaust valve means movable on said piston, spring means engaging said actuating means and normally ineffective to move the actuating means relative to said exhaust valve means so long as said piston is in normal predetermined position and effective to cause movement of said actuating means relative to said exhaust valve means to open the same on movement of said piston relative to said spring means on displacement of said piston away from said closure means a distance greater than that established by the said predetermined position of the piston relative to said closure means, said pump means and said exhaust valve means effecting control of the volume of fluid in the said body of fluid to dispose the said piston in a predetermined at rest position between opposite ends of the cylinder under variable load conditions carried by the vehicle, said actuating means being disposed in a chamber receiving exhaust hydraulic fluid from the said valve, means forming a resistance passage from said chamber to resist flow of exhaust fluid from the chamber to said reservoir and thereby retard actuating movement of said actuating means during normal stroke movement of said piston.

References Cited in the file of this patent

UNITED STATES PATENTS

| | | |
|---|---|---|
| 2,308,404 | Thornhill | Jan. 12, 1943 |
| 2,436,573 | Heynes | Feb. 24, 1948 |
| 2,571,279 | Myklestad | Oct. 16, 1951 |
| 2,616,687 | Butterfield | Nov. 4, 1952 |
| 2,620,182 | Marston et al. | Dec. 2, 1952 |

FOREIGN PATENTS

| | | |
|---|---|---|
| 953,409 | France | May 23, 1949 |